(No Model.)
H. JAMES & G. ROBINSON.
MEANS FOR CONVERTING MOTION.
No. 379,277. Patented Mar. 13, 1888.
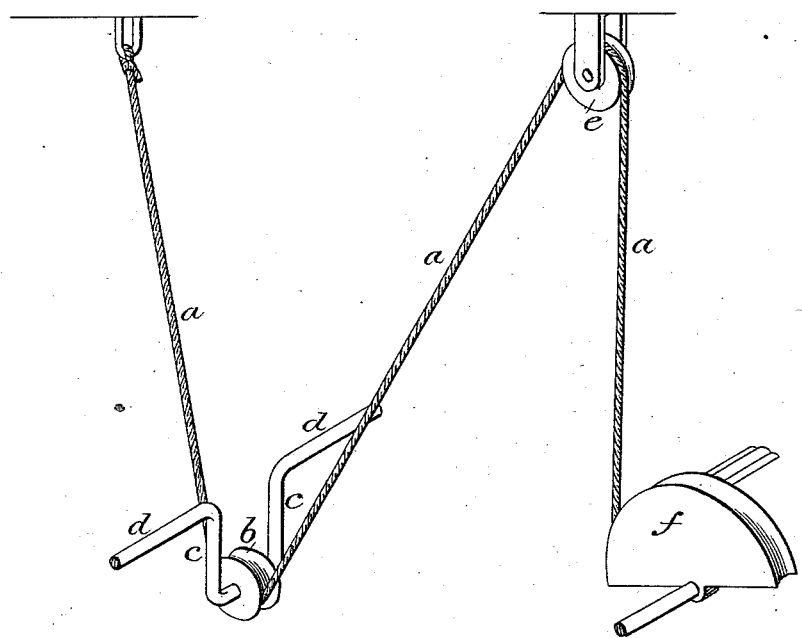

United States Patent Office.

HORACE JAMES AND GEORGE ROBINSON, OF SHEFFIELD, COUNTY OF YORK, ENGLAND.

MEANS FOR CONVERTING MOTION.

SPECIFICATION forming part of Letters Patent No. 379,277, dated March 13, 1888.

Application filed August 17, 1886. Serial No. 211,174. (No model.) Patented in England June 20, 1885, No. 7,518.

*To all whom it may concern:*

Be it known that we, HORACE JAMES, ironmonger, and GEORGE ROBINSON, engineer, subjects of the Queen of Great Britain, of Sheffield, in the county of York, England, have invented Means for Converting Motion, (for which we have obtained Letters Patent in Great Britain, No. 7,518, and bearing date June 20, 1885;) and we do hereby declare that the following is a full, clear, and exact description thereof.

Our invention relates to improvements in the means for transmitting the reciprocating motion of treadles or hand-levers in bicycles, tricycles, sewing-machines, lathes, and similar machines to the driving-wheel, and has for its object the increase of power without a corresponding loss of speed. This object we attain by means of the mechanism illustrated in the accompanying drawing, in which the figure is an elevation of our improved method.

To the frame or other fixed part of the machine we permanently attach one end of a cord, band, or chain, $a$. This is passed round a suitable pulley or roller, $b$, upon the crank $c$ of the axle $d$ (or upon a fork or other bearing on the crank of the axle) and round another suitable pulley or roller, $e$, attached to the frame or other fixed part of the machine. The other end of the cord or band $a$ is attached to a pulley or cam, $f$, upon a pivot or shaft in suitable bearings. This pulley or cam $f$ is grooved and made of a suitable size, so that it takes up a sufficient length of the cord or band $a$ round its circumference to lift the crank to its proper height at each revolution. Where two treadles (or hand-levers) are employed we place each treadle and cam (or hand-lever and cam) upon a separate shaft or pivot and gear them so that they work together with an alternate motion, so that the cord, band, or chain $a$ is always held at a proper tension and works with a firm motion.

What we claim, and desire to secure by Letters Patent of the United States, is—

The cord or band $a$, fixed at one end and passing over pulleys $b$ and $e$, pulley $b$ being attached to the crank of the axle, and the other end of said cord secured to a cam or treadle, $f$, all combined substantially as described and shown.

In testimony that we claim the foregoing we have hereunto set our hands.

HORACE JAMES.
    GEORGE ROBINSON.

Witnesses:
 JOHN HENRY TOPHAM,
 JAMES DONNISON.